12) United States Patent
Sill et al.

(10) Patent No.: US 7,697,435 B1
(45) Date of Patent: Apr. 13, 2010

(54) DYNAMIC BACKHAUL DELAY DETERMINATION

(75) Inventors: Timothy Wayne Sill, Platte City, MO (US); Samuel M. Woleben, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 506 days.

(21) Appl. No.: 11/670,831

(22) Filed: Feb. 2, 2007

(51) Int. Cl.
G06F 11/00 (2006.01)
H04J 3/06 (2006.01)
(52) U.S. Cl. ...................... 370/235; 370/519
(58) Field of Classification Search ................ 370/229, 370/230, 230.1, 231, 235, 508, 516, 517, 370/519, 412, 428, 429
See application file for complete search history.

(56) References Cited

U.S. PATENT DOCUMENTS

| | | | | |
|---|---|---|---|---|
| 5,905,730 A * | 5/1999 | Yang et al. | ................ | 370/429 |
| 6,671,257 B1 * | 12/2003 | Soumiya et al. | .......... | 370/230.1 |
| 7,106,696 B1 * | 9/2006 | Lim et al. | ................ | 370/230.1 |
| 7,215,672 B2 * | 5/2007 | Reshef et al. | ............ | 370/395.1 |
| 7,263,066 B1 * | 8/2007 | Yun et al. | .................... | 370/236 |
| 7,292,609 B2 * | 11/2007 | Oura | .......................... | 370/519 |
| 2001/0033581 A1 * | 10/2001 | Kawarai et al. | ............. | 370/468 |
| 2002/0031099 A1 * | 3/2002 | Cookman et al. | ........... | 370/282 |
| 2006/0256723 A1 * | 11/2006 | Hellenthal | ................. | 370/235 |
| 2007/0071022 A1 * | 3/2007 | Pan et al. | ..................... | 370/412 |
| 2008/0212475 A1 * | 9/2008 | Oueslati et al. | ............. | 370/235 |

* cited by examiner

Primary Examiner—Chi H Pham
Assistant Examiner—Warner Wong

(57) ABSTRACT

A method of operating a communication system comprises receiving a plurality of traffic, processing each traffic of the plurality of traffic to determine if a delay of the traffic exceeds a delay limit, discarding the traffic if the delay exceeds the delay limit, retaining the traffic if the delay does not exceed the delay limit, incrementing a late counter from a base amount of the late counter when the delay exceeds the delay limit, incrementing a retained counter from a base amount of the retained counter when the delay does not exceed the delay limit, returning the late counter to the base amount of the late counter when the delay does not exceed the delay limit and when the delay of a previous traffic exceeded the delay limit, clearing the retained counter to the base amount of the retained counter when the delay exceeds the delay limit and when the previous traffic did not exceed the delay limit, increasing the delay limit when the late counter exceeds a late limit, and decreasing the delay limit when the retained counter exceeds a retained limit.

16 Claims, 4 Drawing Sheets

DYNAMIC BACKHAUL DELAY DETERMINATION

BACKGROUND OF THE INVENTION

1. Field of the Invention

The invention is related to the field of communications, and in particular, to systems that dynamically adjust backhaul delay parameters.

2. Description of the Prior Art

Communication service providers, such as wireless telecommunication carriers, common carriers, cable multi-service operators, or the like, typically strive to provide high quality communication services. Factors from the quality of a handset used on a wireless call to congestion levels experienced on a network could negatively impact the quality or performance of a particular communication.

In many cases, establishing and perfecting the timing of various network operations plays a large role in determining the overall quality of a communication. In one particularly problematic area, determining and setting appropriate levels of allowed backhaul delay has become increasingly difficult as instances of diverse backhaul have become more common.

Typically, backhaul traffic is transmitted, transported, or carried in discrete part, such as packets, frames, or timeslots, depending upon the type of the backhaul. Regardless of the form of the discrete traffic, when received at a receiving end, such as a device or a central communication node, each portion of traffic has a delay relative to when the traffic left or was sent by the transmitting end of a link. Traffic delay is a well known concept in the art.

In many situations, traffic delay impacts the performance or quality of a communication. In a video example, too much traffic delay could cause jitter or other undesirable characteristics at the receiving and viewing end of the video. Likewise, too much traffic delay could cause interruptions in voice calls. In the case of mobile telephony, roaming functions, such as hand-offs between base stations, could be impacted. Other consequences of delay are well known.

In an effort to lessen the consequences of traffic delay, many communication systems simply discard traffic having a delay that exceeds an acceptable delay parameter or window. Typically, it is desirable to set the delay window as small as possible. However, a delay window that is too small will result in too much discarded traffic. While a large delay window results in little discarded traffic, slow traffic can lead to other system or network degradations. Thus, network engineers are constantly challenged with setting delay windows to appropriate levels.

SUMMARY OF THE INVENTION

Embodiments of the invention help solve the above problems and other problems with systems, methods, and software dynamically and automatically calibrating delay parameters. In particular, embodiments of the invention allow for increasing delay windows, when necessary, and reactively reducing delay windows to appropriate levels after the need for an expanded window has passed.

In an embodiment of the invention, a communication system comprises an interface configured to receive a plurality of traffic and a processing system coupled to the interface and configured to process each traffic of the plurality of traffic to determine if a delay of the traffic exceeds a delay limit, discard the traffic if the delay exceeds the delay limit, and retain the traffic if the delay does not exceed the delay limit, wherein the processing system, when the delay exceeds the delay limit, increments a late counter from a base amount of the late counter, wherein the processing system, when the delay does not exceed the delay limit, increments a retained counter from a base amount of the retained counter, wherein the processing system, when the delay does not exceed the delay limit and when the delay of a previous traffic exceeded the delay limit, returns the late counter to the base amount of the late counter, wherein the processing system, when the delay exceeds the delay limit and when the previous traffic did not exceed the delay limit, returns the retained counter to the base amount of the retained counter, wherein the processing system, when the late counter exceeds a late limit, increases the delay limit, and wherein the processing system, when the retained counter exceeds a retained limit, decreases the delay limit.

In an embodiment of the invention, the previous traffic and the traffic are received consecutively and wherein the previous traffic is received prior to the traffic.

In an embodiment of the invention, the traffic and the previous traffic are received over a same communication link.

In an embodiment of the invention, the traffic comprises packets.

In an embodiment of the invention, the traffic comprises frames.

In an embodiment of the invention, the delay limit comprises an actual delay of the traffic.

In an embodiment of the invention, the delay limit comprises a differential delay between the traffic received over a first communication link and another traffic received over a second communication link.

In an embodiment of the invention, the first communication link is a diverse type of communication link than the second communication link.

In an embodiment of the invention, a method of operating a communication system comprises receiving a plurality of traffic, processing each traffic of the plurality of traffic to determine if a delay of the traffic exceeds a delay limit, discarding the traffic if the delay exceeds the delay limit, retaining the traffic if the delay does not exceed the delay limit, incrementing a late counter from a base amount of the late counter when the delay exceeds the delay limit, incrementing a retained counter from a base amount of the retained counter when the delay does not exceed the delay limit, returning the late counter to the base amount of the late counter when the delay does not exceed the delay limit and when the delay of a previous traffic exceeded the delay limit, clearing the retained counter to the base amount of the retained counter when the delay exceeds the delay limit and when the previous traffic did not exceed the delay limit, increasing the delay limit when the late counter exceeds a late limit, and decreasing the delay limit when the retained counter exceeds a retained limit.

In an embodiment of the invention, a computer program product includes a medium readable by a processor, the medium having stored thereon instructions that when executed by the processor causes the processor to process a plurality of traffic to determine if a delay of each traffic of the plurality of traffic the traffic exceeds a delay limit, discard the traffic if the delay exceeds the delay limit, retain the traffic if the delay does not exceed the delay limit, increment a late counter from a base amount of the late counter when the delay exceeds the delay limit, increment a retained counter from a base amount of the retained counter when the delay does not exceed the delay limit, return the late counter to the base amount of the late counter when the delay does not exceed the delay limit and when the delay of a previous traffic exceeded the delay limit, clear the retained counter to the base amount of the retained counter when the delay exceeds the delay limit and when the previous traffic did not exceed the delay limit, increase the delay limit when the late counter exceeds a late limit, and decrease the delay limit when the retained counter exceeds a retained limit.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
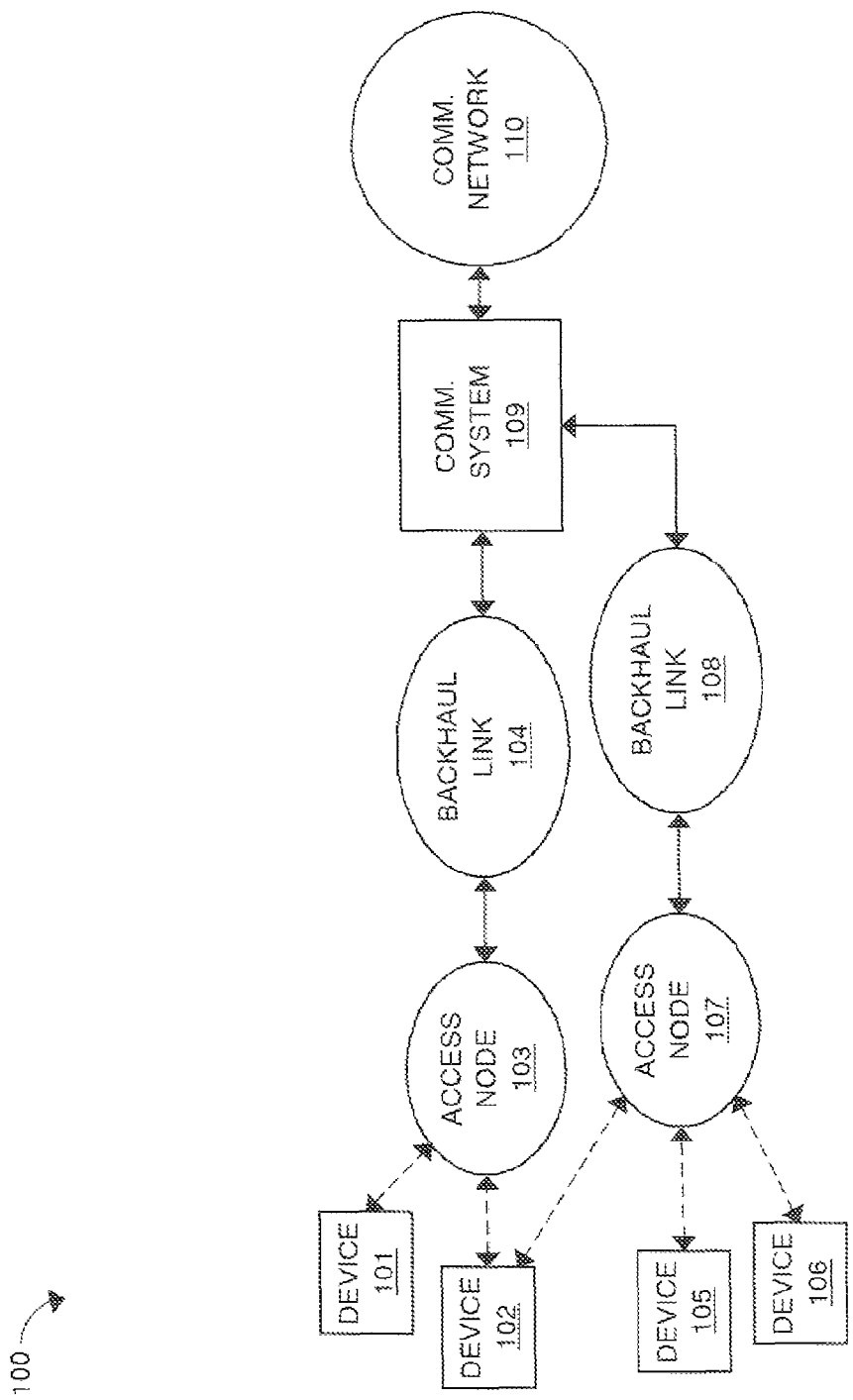
FIG. 1 illustrates a communication network in an embodiment of the invention.

FIG. 1 illustrates communication network 100 in an embodiment of the invention. Communication network 100 advantageously allows for dynamically and automatically calibrating delay parameters. In particular, communication system 109 provides for increasing delay windows, when necessary, and reactively reducing delay windows to appropriate levels after the need for an expanded window has passed.

Communication network 100 includes devices 101 and 102, access node 103, backhaul link 104, communication system 109, and communication network 110. Communication network 100 further includes devices 105 and 106, access node 107, and backhaul link 108.

Communication system 109 is operatively coupled to or in communication with communication network 110 via a connection well known in the art. Communication system 109 could be any system or collection of systems capable of receiving, transferring, processing, or otherwise interfacing communications between devices 101, 102, 105, and 106 and communication network 110 via backhaul links 104 and 108, and access nodes 103 and 107. In an example, communication system 109 could comprise a base station controller or a mobile switching center, as well as other types of communication systems or any combination thereof. In another example, communication system 109 could comprise a soft switch, a media gateway, a border gateway, or any other communication system or combination thereof. It should be understood that communication network 110 could be a network or a collection of networks.

Backhaul link 104 could be any link, network, or channel capable of carrying traffic between access node 103 and communication system 109. Likewise, backhaul link 108 could be any link, network, or channel capable of carrying traffic between access node 107 and communication network 109. Examples of backhaul links include, but are not limited to, synchronous optical network (SONET) rings, cable Ethernet links, WiMax (IEEE 802.16 standard) links, mesh networks, or time division multiplexed links, as well as any other type of link or any combination thereof.

Communication system 109 is also operatively coupled to or otherwise in communication with access node 103 over backhaul link 104. As discussed, backhaul link 104 could be any well known link, channel, or network capable of connecting access node 103 to communication system 109. Communication system 109 is further operatively coupled to or otherwise in communication with access node 107 over backhaul link 108. As discussed, backhaul link 108 could be any well known link, channel, or network capable of connecting access node 107 to communication system 108.

Access node 103 is operatively coupled to or otherwise in communication with backhaul link 104 and devices 101 and 102. Access node 103 could be capable of interfacing communications between devices 101 and 102 and communication system 109 over backhaul link 104. Although not shown for purposes of clarity, it should be understood that access node 103 could be capable of communicating with devices 105 or 106.

Access node 107 is operatively coupled to or otherwise in communication with backhaul link 108 and devices 105 and 106. Access node 107 could be capable of interfacing communications between devices 105 and 106 and communication system 109 over backhaul link 108. As illustrated, access node 107 could also be capable of communicating with device 102. Although not shown, it should be understood that access node 107 could also be capable of communicating with device 101.

Examples of access nodes, such as access nodes 103 and 107, could include, but are not limited to, base transceiver stations, terminal adapters, or wireless modems, as well as other types of access nodes.

Devices 101, 102, 105, and 106 could be any type of device capable of communicating with communication network 110 via access nodes 103 and 107, backhaul links 104 and 108, and communication system 109. Examples of such devices include, but are not limited to, mobile phones, personal digital assistants, personal computers, laptop computers, or pagers, as well as other similar devices.

In an operation, devices 101, 102, 105, and 106 transmit and receive communications or traffic to and from communication network 110 via communication system 109, backhaul links 104 and 108, and access nodes 103 and 107. In the direction of transmitting from devices 101, 102, 105, and 106 to communication network 110, communication system 109 receives and processes the traffic to determine whether or not the traffic delay meets an acceptable parameter. For instance, if the traffic delay falls outside of an acceptable delay window, the traffic is discarded. If the traffic delay falls within the window, the traffic is retained.

Figure 2:
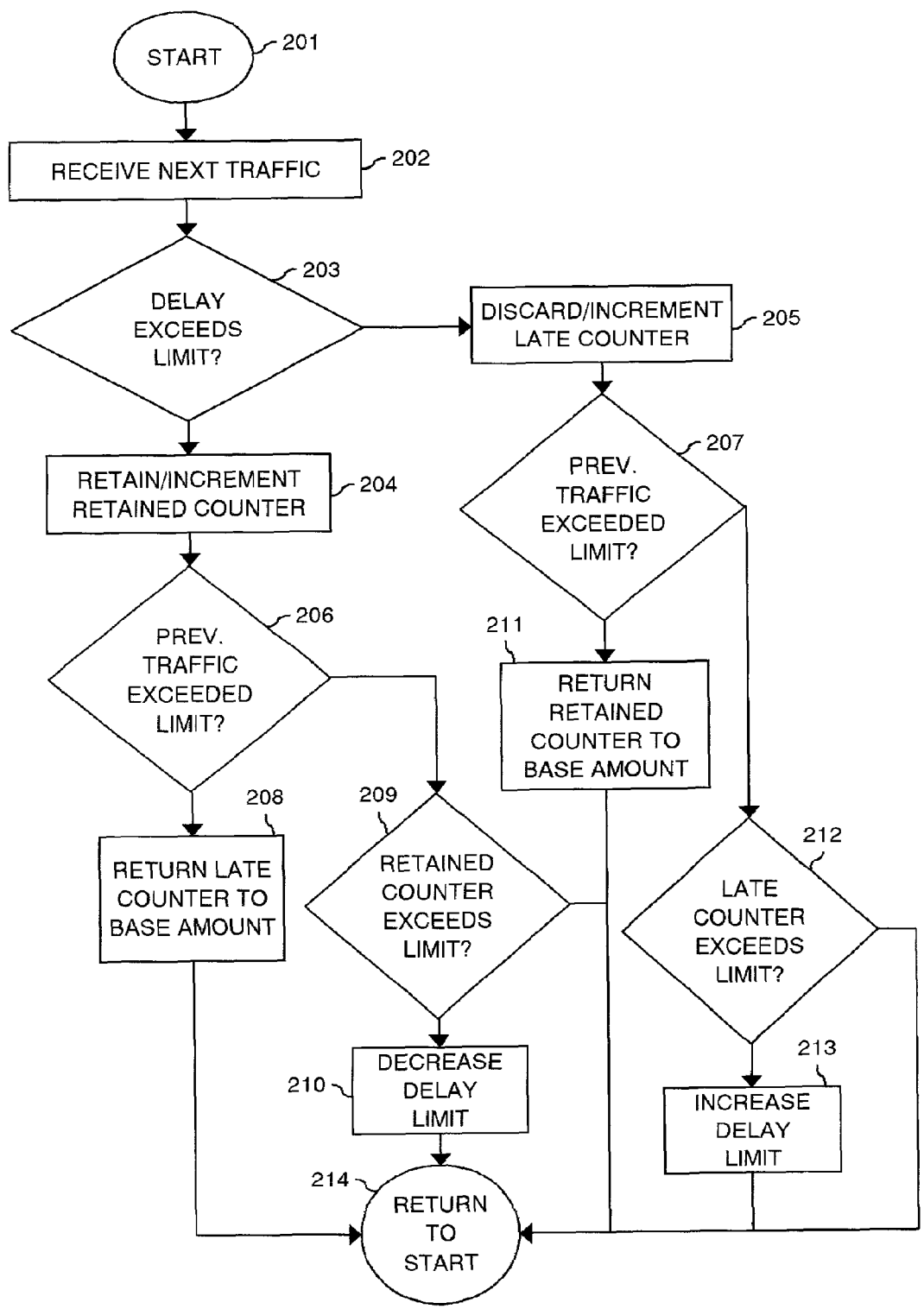
FIG. 2 illustrates a process in an embodiment of the invention.

FIG. 2 illustrates a process employed by communication system 109 in an embodiment of the invention to discriminate traffic based on delay. In addition, the process illustrated in FIG. 2 provides for dynamically and automatically adjusting delay parameters by which the traffic is measured.

Figure 3:
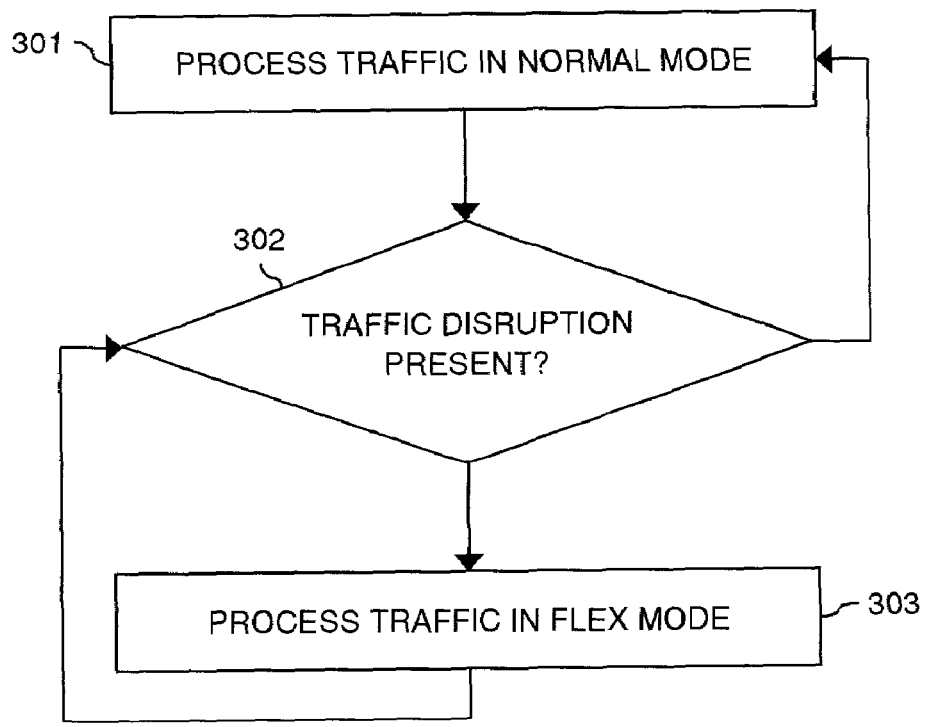
FIG. 3 illustrates a process in an embodiment of the invention.

Referring to FIG. 2, the process begins at a starting point (Step 201). It should be understood that the process could be initiated or implemented at anytime during the operation of communication system 109. However, it should also be understood that FIG. 3 illustrates a process by which communication system 109 determines when to initiate the process described in FIG. 2. It should be further understood that the process described in FIG. 3 is in no way limiting of the process described in FIG. 2 and could be considered optional.

Returning again to FIG. 2, communication system 109 receives next traffic (Step 202). The next traffic could be any traffic received after a previous traffic. It should be understood that the traffic could be in the form of packets or frames, as well as in other forms. The traffic could be individually time-stamped at their source, such as a device or an access node. It should be understood that the delay limit could comprise any number of a variety of factors. For example, the delay limit could comprise the delay incurred by traffic sent from access node 103 to communication system 109. In such a case, access node 103 could receive traffic from device 101, time stamp the traffic, and transmit the traffic to communication system 109. Communication system 109 could be synchronized with access node 103. Communication system 109 could compare the time at which the traffic is received to the time stamp included with the traffic to determine the total amount of time the traffic is delay in transit.

In another example, the delay limit could comprise a differential delay between two different traffic streams. For example, device 102 could communicate with both access node 103 and 107, as illustrated in FIG. 2. Such operation is well known in the art. Device 102 could transmit traffic that is received by both access node 103 and 107 and simultaneously transferred over backhaul link 104 and backhaul link 108 to communication system 109. Communication system 109 could compare each individual traffic stream, representing the same traffic, to determine the differential delay between the two backhaul links. The delay of one backhaul link 108 could be compared to the delay of the other backhaul link 104. The differential delay could comprise the difference in time between the delay of backhaul link 108 and backhaul link 104.

Upon receiving the next traffic, communication system 109 determines the delay of the traffic (by comparing the time-stamp to the received time) and then determines whether or not the delay exceeds a delay limit (Step 203). If the delay exceeds the delay limit, the traffic is discarded and a late counter is incremented as the discarded traffic is considered to have arrived late (Step 205). The late counter could comprise a counter that tracks a number individual traffic parts or elements that are late consecutively. If the delay does not exceed the delay limit, the traffic is retained and a retained counter is incremented (Step 204). The retained counter coupled comprise a counter that tracks a number of individual traffic parts or elements that are retained consecutively.

As mentioned, the next traffic is any traffic received after a previous traffic. In this embodiment, it is assumed that the previous traffic was received and processed in the same manner as the next traffic. In addition, it is assumed that the characteristics of the previous traffic, such as whether or not the traffic exceeded the delay limit, are stored for later use.

After Step 204, communication system 109 next determines whether or not the previous traffic exceeded the delay limit (Step 206). If so, the late counter is returned to its base amount (Step 208). The base amount could be set to zero, as well as any other arrived upon base number. After Step 208, communication system 109 returns to the start (Step 214). If not, communication system 109 determines whether or not the retained counter exceeds a retained limit (Step 209). If so, communication system 109 decreases the delay limit (Step 210). After decreasing the delay limit, communication system 109 returns to the start (Step 214).

After Step 205, communication system 109 next determines whether or not the previous traffic exceed the delay limit (Step 207). If so, communication system 109 returns the retained counter to its base amount (Step 211). After Step 211, communication system 109 returns to the start (Step 214). If the previous traffic did not exceed the delay limit, communication system 109 determines whether or not the late counter exceeds a late limit (Step 212). If so, communication system 109 increases the delay limit. If not, communication system 109 returns to the start (Step 214) without altering the delay limit.

FIG. 3 further illustrates the operation of communication system 109 in an embodiment of the invention. Referring to FIG. 3, communication system 109 could begin operation in a normal mode (Step 301), such as when traffic received from backhaul link 104 and traffic received from backhaul link 108 generally matches normal traffic patterns. Normality could be determined by communication system 109 based on a discard rate of the traffic from either backhaul link 104 or 108.

Communication system 109 could continually monitor for the presence of traffic disruptions (Step 302). For example, communication system 109 could monitor for spikes in a discard rate of traffic from either backhaul link 104 or 108. In another example, communication system 109 could be notified from an outside source of a major traffic disruption, such as a weather event that could possibly cause traffic delay.

Communication system 109 could be programmed to check or monitor traffic periodically for disruptions. In the event of no disruptions, communication system 109 continues to operate in the normal mode. In the normal mode, communication system 109 could process traffic delay against static delay parameters. In the normal mode, static delay parameters provide the advantage of predictability across other networks or other portions of the network. In addition, requiring communication system 109 to utilize static delay parameters could aid with testing, troubleshooting, maintenance, or build-out, as well as other functions. In addition, by requiring a traffic disruption to meet a minimum threshold before switching communication system 109 to flex mode adds stability, rather than allowing intermittent discard rates spikes to unduly influence the delay parameters.

However, in the event that a disruption occurs that meets the minimum threshold, communication system 109 could automatically change to a flex mode whereby communication system 109 determines the delay parameters in a dynamic and automatic fashion, as described in FIG. 2. In this manner, disruptions that cause a persistent spike in the discard rate, for example, could be mitigated by dynamically adjusting the delay parameters.

Figure 4:
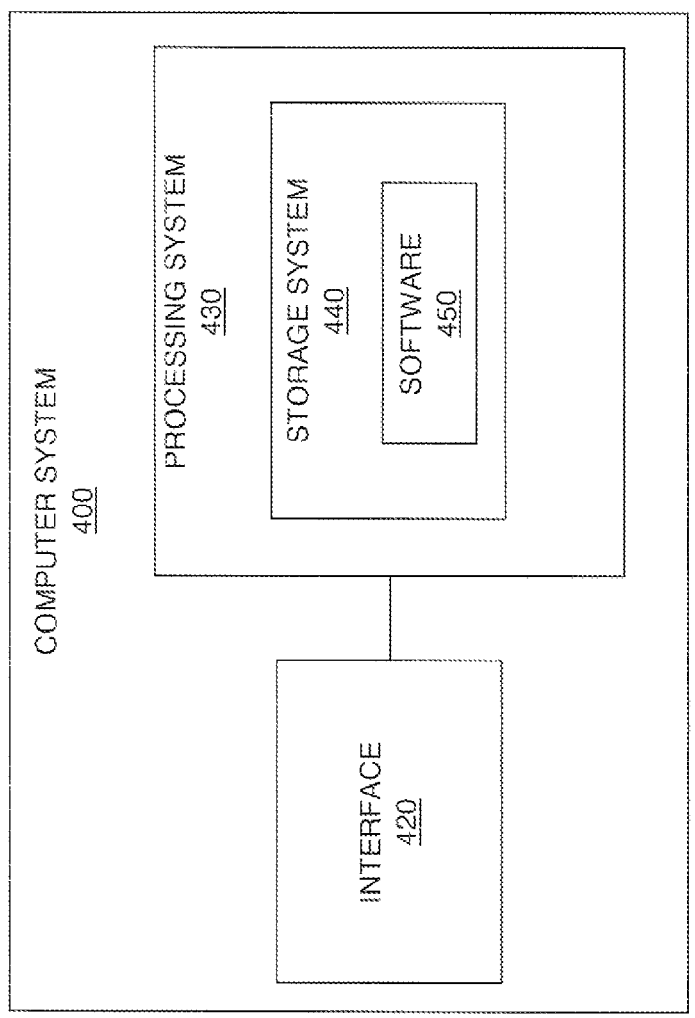
FIG. 4 illustrates a computer system in an embodiment of the invention.

FIG. 4 illustrates computer system 400 in an embodiment of the invention. Computer system 400 includes interface 420, processing system 430, storage system 440, and software 450. Storage system 440 stores software 450. Processing system 430 is linked to interface 420. Computer system 400 could be comprised of a programmed general-purpose computer, although those skilled in the art will appreciate that programmable or special purpose circuitry and equipment may be used. Computer system 400 may use a client server architecture where operations are distributed among a server system and client devices that together comprise elements 420-450.

Interface 420 could comprise a network interface card, modem, port, or some other communication device. Interface 420 may be distributed among multiple communication devices. Interface 430 could comprise a computer microprocessor, logic circuit, or some other processing device. Processing system 430 may be distributed among multiple processing devices. Storage system 440 could comprise a disk, tape, integrated circuit, server, or some other memory device. Storage system 440 may be distributed among multiple memory devices.

Processing system 430 retrieves and executes software 450 from storage system 440. Software 450 may comprise an operating system, utilities, drivers, networking software, and other software typically loaded onto a general-purpose computer. Software 450 could also comprise an application program, firmware, or some other form of machine-readable processing instructions. When executed by the processing system 430, software 450 directs processing system 430 to operate as described herein for communication system 109.

Advantageously communication network 100 allows for dynamically and automatically calibrating delay parameters. In particular, communication system 109 provides for increasing delay windows, when necessary, and reactively reducing delay windows to appropriate levels after the need for an expanded window has passed.

The following describes an operational example of an embodiment of the invention. In current wireless networks, backhaul (BH) delays are typically fixed at a base station controller (BSC) level and all base transceiver stations (BTSs) are required to adhere to that timing. However, if the backhaul delay window is set too wide (too much time) there is the possibility for system degradation due to the increased time it takes for messages to be exchanged back and forth between the BTS and the BSC.

In order to prevent this from happening it is beneficial to set the backhaul delay windows as small as possible during normal operation. The problem occurs when a major failure happens, such as a fiber cut on a synchronous optical network (SONET) ring. In this case backhaul must take the protect path over the long distance of the ring and therefore physical backhaul delays increase. If the backhaul delay is greater than the value set for the backhaul delay window, then messages will be dropped and considered erasures, thereby preventing the system from functioning.

In an advance, a processing system will be baselined with a conservative value for the backhaul delay window. The processing system will compare the timestamp of the received frame with the value for the backhaul delay window. The processing system, rather than simply discarding the late packet, will make an entry in a table/register that the frame or message was late and notate which BTS the frame originated from and how late the frame was before discarding the frame. If the next frame from that BTS is within the acceptable backhaul delay window the table is cleared. Otherwise, if there are several consecutive late frames, then the backhaul delay would need to be incremented. In an example, 10 consecutive late frames could comprise the several consecutive late frames. The increment value could be the maximum of the late values from the table, up to a pre-determined value of the backhaul delay window, such as 25 ms.

If backhaul values are set on a per BTS basis, the processing system could perform a neighbor list comparator function to determine if the expanded delay window would cause a differential delay issue with these sites. If so, then the function could increment the backhaul delay window for these localized sites to overcome a differential delay fault. Likewise, any increment value should be more than the maximum of the late values from the tracking registry table, but no more than the parameter guideline value of the backhaul delay window (i.e. between 0 and 25 ms with standard set point of 16 ms). If backhaul values are set on a per BSC basis, this step could be skipped.

After the backhaul delay window has been opened up, it could be desirable to reduce the delay window to as low a level as possible until the delay window once again reaches the baseline value. In order to accomplish this, the process system will enter a new state and measure the frames from the BTS that triggered the increment as noted above. If several consecutive frames (i.e. 100 frames) arrive within the appropriate backhaul window, the backhaul delay window value will be decremented by 1.

It should be underdstood that that numbers of retained or discarded frames described herein are merely descriptive and that other numbers or ranges could be used. It should further be understood that any decrement or increment values are merely descriptions or optional and that other values could be use.

This process will then repeat (increment/decrement as appropriate) until the backhaul delay window value is decremented back to its original value.

The following claims specify the scope of the invention. Those skilled in the art will appreciate that the features described above can be combined in various ways to form multiple variations of the invention. As a result, the invention is not limited to the specific examples described above, but only by the claims and their equivalents.

The invention claimed is:

1. A communication system comprising:
an interface configured to receive a plurality of traffic; and
a processing system coupled to the interface and configured to process each traffic of the plurality of traffic to determine if a delay of the traffic exceeds a delay limit, discard the traffic if the delay exceeds the delay limit, and retain the traffic if the delay does not exceed the delay limit;
wherein the processing system, when the delay exceeds the delay limit, increments a late counter from a base amount of the late counter;
wherein the processing system, when the delay does not exceed the delay limit, increments a retained counter from a base amount of the retained counter;
wherein the processing system, when the delay does not exceed the delay limit and when the delay of a previous traffic exceeded the delay limit, returns the late counter to the base amount of the late counter;
wherein the processing system, when the delay exceeds the delay limit and when the previous traffic did not exceed the delay limit, returns the retained counter to the base amount of the retained counter;
wherein the processing system, when the late counter exceeds a late limit, increases the delay limit; and
wherein the processing system, when the retained counter exceeds a retained limit, decreases the delay limit.

2. The communication system of claim 1 wherein the previous traffic and the traffic are received consecutively and wherein the previous traffic is received prior to the traffic.

3. The communication system of claim 2 wherein the traffic and the previous traffic are received over a same communication link.

4. The communication system of claim 1 wherein the traffic comprises packets.

5. The communication system of claim 1 wherein the traffic comprises frames.

6. The communication system of claim 1 wherein the delay limit comprises an actual delay of the traffic.

7. The communication system of claim 1 wherein the delay limit comprises a differential delay between the traffic received over a first communication link and another traffic received over a second communication link.

8. The communication system of claim 7 wherein the first communication link is a diverse type of communication link than the second communication link.

9. A method of operating a communication system, the method comprising:

receiving a plurality of traffic;

processing each traffic of the plurality of traffic to determine if a delay of the traffic exceeds a delay limit;

discarding the traffic if the delay exceeds the delay limit;

retaining the traffic if the delay does not exceed the delay limit;

incrementing a late counter from a base amount of the late counter when the delay exceeds the delay limit;

incrementing a retained counter from a base amount of the retained counter when the delay does not exceed the delay limit;

returning the late counter to the base amount of the late counter when the delay does not exceed the delay limit and when the delay of a previous traffic exceeded the delay limit;

clearing the retained counter to the base amount of the retained counter when the delay exceeds the delay limit and when the previous traffic did not exceed the delay limit;

increasing the delay limit when the late counter exceeds a late limit; and decreasing the delay limit when the retained counter exceeds a retained limit.

10. The method of claim 9 wherein the previous traffic and the traffic are received consecutively and wherein the previous traffic is received prior to the traffic.

11. The method of claim 10 wherein the traffic and the previous traffic are received over a same communication link.

12. The method of claim 9 wherein the traffic comprises packets.

13. The method of claim 9 wherein the traffic comprises frames.

14. The method of claim 9 wherein the delay limit comprises an actual delay of the traffic.

15. The method of claim 9 wherein the delay limit comprises a differential delay between the traffic received over a first communication link and another traffic received over a second communication link.

16. The method of claim 15 wherein the first communication link is a diverse type of communication link than the second communication link.

* * * * *